United States Patent [19]

Ruben et al.

[11] Patent Number: 4,834,305
[45] Date of Patent: May 30, 1989

[54] APPARATUS FOR WINDING ROTORS OF ELECTRICAL MACHINES

[75] Inventors: Nikolaus Ruben, Gattikon; Josef Tresch, Kilchberg, both of Switzerland

[73] Assignee: Meteor AG, Switzerland

[21] Appl. No.: 92,397

[22] Filed: Sep. 2, 1987

[30] Foreign Application Priority Data

Sep. 3, 1986 [DE] Fed. Rep. of Germany ....... 3630024

[51] Int. Cl.$^4$ ............................................. H02K 15/04
[52] U.S. Cl. .................................. 242/7.05 A; 242/5
[58] Field of Search ............ 242/7.02, 7.05 A, 7.05 B, 242/7.05 C, 7.09, 7.14

[56] References Cited

U.S. PATENT DOCUMENTS

| 882,253 | 3/1908 | Kunkel | 242/7.05 A |
| 1,408,639 | 5/1922 | Rhoades | 242/7.05 A |
| 3,878,602 | 4/1975 | Schubert | 242/7.05 B X |
| 4,635,865 | 1/1987 | Arnold | 242/7.09 X |

FOREIGN PATENT DOCUMENTS 693954 9/1964 Canada .......................... 242/7.05 A Primary Examiner—Stuart S. Levy
Assistant Examiner—Katherine Matecki
Attorney, Agent, or Firm—Burns, Doane, Swecker & Mathis

[57] ABSTRACT

An apparatus for winding rotors of electrical machines including a winding device for small forms with several winding axes. A coil winding axis of the form is always positioned and fixed coaxially with the axis of the winding tool and wound upon the rotation of the winding form by the winding tool, while the wire guide carries out a predetermined displacing motion for the winding of layers. Back and forth displacement of the wire guide results in a more uniform coil winding with a higher fill factor. Winding by means of the rotation of the winding tool integrated with the coil form holder takes place at rpm's that are several times higher than those of conventional winding machines.

14 Claims, 2 Drawing Sheets

APPARATUS FOR WINDING ROTORS OF ELECTRICAL MACHINES

BACKGROUND OF THE INVENTION

1. Field of the Invention

This invention relates generally to electrical motors and more particularly to an apparatus for winding rotors for such motors.

2. Background Description

In accordance with German Pat. No. 21 02 354 and U.S. Pat. Nos. 3,878,602 and 3,924,816, a multiple winding apparatus for motor rotors is known, wherein a rotor support has vertically located bores with bushings, into which the rotors may be set with their shaft end facing away from the collector. In the winding position, the rotors are pressed against locating ribs as soon as clamping heads are moved into their effective positions, wherein a spring-loaded ball is provided in the clamping head, the ball pressing into one of the grooves. The clamping heads are provided on their forward frontal surface with a recess, each adapted to the circumferential surface of the rotor packs. The recesses extend to the rotor grooves into which the wire is to be wound with the rotor being stationary, while the remaining parts adjacent to the recess of the frontal surface are shaped by beveling or rounding into guide surfaces, the so-called winding templates, for the wire to be wound. Each of the clamping heads is bearingly supported on a shaft, with the shaft being provided at its end facing the clamping head with a winding arm, each consisting of a wire strap with a guide roller at its free end. During the rotation of the shafts, the guide rollers move on a circular path, thereby winding the wires into the rotor grooves. The switching and alignment of the rotors is effected by means of a pawl engaging the grooves with a nose.

However, the winding apparatus is relatively complicated, in particular because as the winding arms are not adjustable, the introduction of the wire to form the individual coils cannot be controlled and furthermore the apparatus is less suitable for extremely small rotors, as longer stops cannot be avoided in case of extremely short winding cycle times.

Multiple coil winding machines are known for example from U.S. Pat. No. 4,635,865 and Swiss Pat. No. 01786/85-0 for the winding in layers of electrical coils. To be able to wind the great variety of different coil forms in winding machines of this type, the movement of the wire guides and the wire cutting device is displaceable in the X, Y and Z axes, with the wire cutting devices being additionally displaceable relative to the wire guide and also rotatable around their own vertical axis, while being capable of tilting, together with the wire guides. This also assures that the coil wire ends may be applied to all possible connecting elements automatically, exactly and rapidly. The connecting elements may be positioned radially, axially, unilaterally or bilaterally relative to the coil. The coils are wound by rotating the coils set into the winding tool around the axis of the winding tool, while the wire guide merely carries out an advance motion for the clean winding of the individual layers. This makes very high winding velocities possible whereby time losses may be kept very low, even with very short winding cycles.

British Pat. No. 919 652 and German Pat. No. 12 63 159 disclose rotor winding machines wherein the rotor is gripped by a clamping device, whereby the guide surfaces of the guide body make certain that the wire coming from the supply roll is being guided into the grooves to be wound. In the process, the rotor turns with its axis perpendicular to the winding axis, and for the winding of the next layer the anchor is rotated further by a groove division, while the winding tool is stationary. In the British patent, fixation in the prevailing winding position is effected by means of a spring-loaded spherical catch pressing into the gap of a groove. To switch the rotor for the next winding, an angle hook presses against the edge of a groove and rotates the rotor if a key is depressed by one groove division. In these known winding machines the wire is introduced by the aforementioned guide surfaces into the groove, but it is not wound cleanly in layers.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus for winding rotors of electrical machines including a winding apparatus for small forms with several winding axes, in particular multipolar rotors equipped with collectors with an even or odd number of grooves, whereby winding templates and revolving winding arms are eliminated and the introduction of wires into the grooves to form the coils wound in layers is significantly improved.

A particular advantage of the invention is that the winding tool together with the form holder constitutes a winding unit, so that the winding of the forms with several coil winding axes may be carried out in a manner such that a coil winding axis of the form is always positioned and fixed coaxially with the axis of the winding tool and wound upon the rotation of the winding form by the winding tool, while the wire guide carries out a predetermined displacing motion for the winding of layers. This renders the winding arms and winding templates unnecessary.

The back and forth displacement of the wire guide additionally results in a more uniform coil winding with a higher fill factor than that obtained with a conventional rotor winding using winding arms.

A further advantage is that winding by means of the rotation of the winding tool integrated with the coil form holder, takes place at rpm's that are several times higher than those of conventional winding machines, so that a significant increase in production is assured.

In an advantageous manner, the layouts known from layer winding machines of the wire guides and the wire cutting devices are taken over and combined with the additionally required switching devices, so that the guidance of the wire and the fixation of the coil wire ends, together with the cutting of the coil wire ends in all possible locations, are assured automatically and exactly with minimal time losses, even with extremely short winding cycles.

The foregoing and other aspects will become apparent from the following detailed description of the invention when considered in conjunction with the accompanying drawing figures. It is to be expressly understood, however, that the drawing figures are not intended as a

BRIEF DESCRIPTION OF THE DRAWING FIGURES

DETAILED DESCRIPTION

Figure 1:
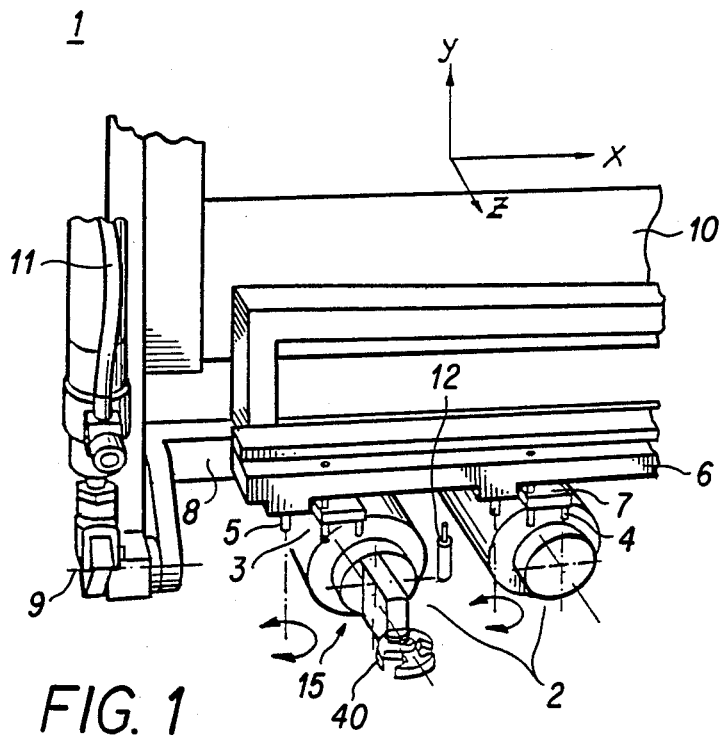
FIG. 1 illustrates a partial perspective view of an embodiment of a multiple winding machine in the area of the first two winding stations with a winding tool integrated with a coil form holder.

In FIG. 1, a multiple winding machine illustrated in the area of the first two winding stations 2 is designated 1. For each winding station 2, a wire guide 3, and a wire cutting device 5 are actively connected with a switching device 4. The wire guide 3 and the switching device 4 are located in holders 7 and are connected with a pivot arm 8. The wire cutting device 5 is placed in a holder 6, which is also connected with the pivot arm 8 that may be pivoted 90° around a tilting shaft 9 by means of a pneumatic cylinder. A holding pin 12 is also shown in FIG. 1 and provides a point at which the end of the coil wire may be twisted at the onset of the winding process. To displace the wire guide 3, the switching device 4 and the wire cutting device 5, a slide 10 movable in the X, Y, Z axial directions as indicated in FIG. 1 is provided. The wire cutting device 5 may be additionally displaced parallel relative to the wire guide 3 and the switching device 4 and rotated around its vertical axis. The cooperation of the wire guide 3 with the switching device 4 and the wire cutting device 5 makes the universal processing of the coil wire ends 48, FIG. 3, possible with winding forms of different configurations and several coil winding axes, for example on a three-pole rotor or coil form 40, onto connecting pins 46, FIG. 3, radially or axially mounted on a collector 44. Such a rotor 40 is set for winding in a winding tool 15, in the first winding station 2 of the multiple winding machine 1.

Figure 2:
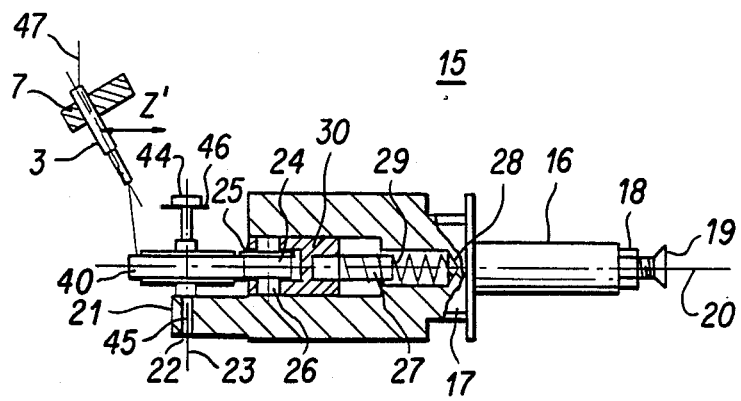
FIG. 2 illustrates a longitudinal section of the winding tool according to FIG. 1.
Figure 2A:
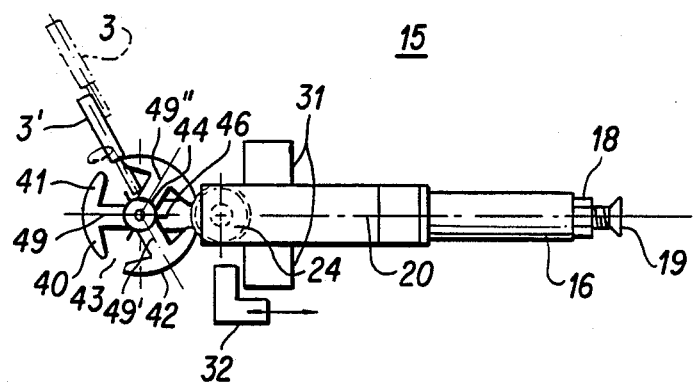
FIG. 2a illustrates a horizontal projection of the winding tool according to FIG. 2.

According to FIGS. 2, 2a, each winding tool has a holding shaft 16 with positioning surfaces 17 and a counter nut 18, together with a spacing stop 19. The winding tool 15 may be rotated around a winding axis 20. The outer frontal surface of the winding tool 15 is preceded by a winding form holder 21, which comprises a receiving bore 22 located perpendicularly to the winding tool axis 20, having a switching axis 23, and into which, for example, the three-pole rotor 40 may be inserted with its shaft end 45 located opposite the collector 44. The winding tool body is U-shaped according to FIG. 2 and is open toward the outer frontal surface. The U-shaped body includes a longer U-leg, a relatively shorter U-leg and a connecting web at an end opposite the open outer frontal surface. A spring-loaded slide 30 is located in the U-shaped internal recess and has a fork like configuration on its outer frontal surface, and a positioning catch 24 with a flange 25, together with a guide bolt 27 projecting into a bore 28. The guide bolt 27 is surrounded by a helical compression spring 29 resting against the frontal surface of the bore 28 and pressing the positioning catch 24 against the coil form 40 and securing it with the flange 25. Sliding pieces 31 are connected with the slide 30 and are capable of sliding on both sides on the flat lateral surfaces of the winding tool 15. The positioning catch 24 mounted on the slide 30 may be pushed back by means of the sliding pieces 31 by a resetting device 32 in the form of a sliding piece against the force of the compression spring 29 from the area of the coil form holder 21. In FIG. 2 the wire guide 3 is illustrated in the winding position wherein it is moved in the direction of the arrow Z' along the Z-axis, and in FIG. 2a, a twist-on position 3' whereby the coil wire ends are twisted onto the connecting pins is illustrated additionally by a solid line.

Figure 3:
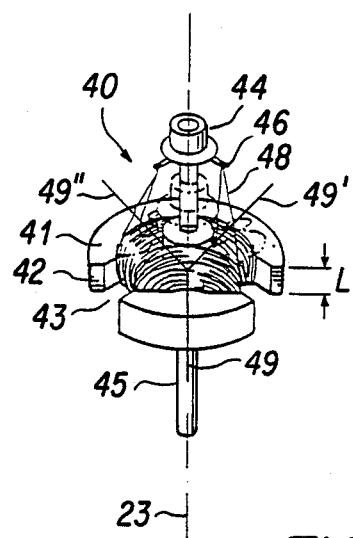
FIG. 3 illustrates a wound three-pole rotor with coil wire ends fastened to connector pins of the collector and relieved of stress.

FIG. 3 illustrates a ready wound three-pole rotor 40 with a collector 44, to the connecting pins 46 whereof the coil wire ends 48 are fastened, preferably by twisting. The minimum axial distance between the coil winding axles 49, 49', 49'', FIG. 2a, and the connecting pins 48 of the collector 44, is predetermined as a function of the coil form 40 to be wound so that in the course of the winding process, the wire guide 3 has enough space between the connecting pin 46 and the corresponding coil winding axle 49 to carry out the displacing forward movement without interference. Particularly suitable are rotors 40 with a lesser rotor sheet metal pack 41 which has a rotor sheet metal pack length designated by the letter L. The shaft end 45 located opposite the collector 44 may be inserted into the coil form holder 21, FIG. 2. The switching device 4, FIG. 1, preferably with a switching pin, may be guided on frontal casing surface 42 of the rotor sheet metal pack 41 and switches, i.e. turns the rotor 40 around the switching axle 23, FIGS. 2, 2a, from one to the next rotor groove 43, into which the positioning catch 24, FIG. 2a, is then locking in the above-described manner.

Following the completion of the rotor winding, in a subsequent working step the coil wire ends 48 fastened to the connecting pins 46 are soldered and the coil wire ends 48 relieved by depressing the collector 44 mounted on the shaft to the wound coil, into the position indicated by broken lines in FIG. 3.

While this invention has been illustrated and described in accordance with a preferred embodiment, it is recognized that variations and changes may be made therein without departing from the invention as set forth in the claims.

What is claimed is:

1. Apparatus for winding rotors of electrical machines, wherein the rotors have collectors and several windings having different coil winding axes, with at least one winding station, comprising:

a rotating winding tool for fixedly positioning a coil form to be wound;

a guide member for guiding coil wire from a supply roll;

a means to secure ends of the coil wire to connecting pins of the collectors;

a wire cutting member;

a switching means to rotate the coil form until its fixation by a positioning catch of the winding tool at a position for winding its next coil on the winding axes; and, a driving and control means, the winding tool further comprising:

a receiving bore for holding said coil form and being located unilaterally and perpendicularly relative to the winding tool's axis of rotation to provide a switching axis which is different from the coil winding axes, around which the form may be rotated by said switching means in both directions of rotation, and the guide member being in the form of a wire guide displaceable along X, Y and Z axes and also pivotable, with said wire guide carrying out advance movements to form coil windings by controllably placing the wire in grooves on the rotor.

2. Apparatus for winding rotors of electrical machines, wherein the rotors have collectors and several windings having different coil winding axes, with at least one winding station comprising:

a rotating winding tool for fixedly positioning a coil form to be wound wherein the winding tool is U-shaped, with a longer U-leg, a relatively shorter U leg and a connecting web between the U legs, and with a holding shaft projecting from said connecting web of the U legs;

a guide member for guiding coil wire from a supply roll;

a means to secure ends of the coil wire to connecting pins of the collectors;

a wire cutting member;

a switching means to rotate the coil form until its fixation by a positioning catch of the winding tool at a position for winding its next coil on the winding axes, the positioning catch including a spring-loaded slide located between the U legs, the positioning catch being urged into engagement with the coil form; and, a driving and control means, the winding tool further comprising:

a receiving bore for holding said coil form and being located unilaterally and perpendicularly relative to the winding tool's axis of rotation to provide a switching axis which is different from the coil winding axes around which the form may be rotated by said switching means in both directions of rotation, the receiving bore being provided in the longer U leg and the guide member being in the form of a wire guide displacement along X, Y and Z axes and also pivotable, with said wire guide carrying out advance movements to form coil windings by controllably placing the wire in grooves on the rotor.

3. Apparatus according to claim 2, wherein the positioning catch includes a securing flange abutting against a sheet metal pack of the coil form.

4. Apparatus according to claim 2, wherein the slide projects laterally past the U legs of the winding tool, said apparatus further comprising:

resetting means for engaging and returning the slide with the positioning catch to release the coil form.

5. A multiple winding machine comprising:

a plurality of winding stations each including a winding tool, a wire guide, a switching member, a wire cutting member coupled to said switching member, a pivot arm, first holder means connected to said pivot arm for holding said wire guide and said switching member, second holder means connected to said pivot arm for holding said wire cutting member, pneumatic means for pivoting said pivot arm, a slide means movable in X, Y and Z axes for displacing the wire guide, switching member and the wire cutting member, said wire cutting member being displaceable parallel relative to said wire guide and said switching member.

6. The winding machine of claim 5, including:

each winding tool having a holding shaft with positioning surfaces, a counter nut and a spacing stop, said tool being rotatable around a winding axis.

7. The winding machine of claim 6, including:

a winding form holder having a receiving bore therein, said bore being perpendicular to said winding axis and defining a switching axis.

8. The winding machine of claim 7, including:

a three-pole rotor having a collector and a shaft rotatably mounted in said receiving bore.

9. The winding machine of claim 6, wherein said winding tool is U-shaped.

10. The winding machine of claim 9, including:

a spring loaded slide mounted in a recess formed by said U-shaped tool.

11. The winding machine of claim 10, including:

a bore formed in said recess of said tool; and a positioning catch including a flange connected to said slide and having a guide bolt projecting into said bore, said guide bolt having a helical compression spring connected therewith and extending into said bore, said spring urging said positioning catch and said flange into engagement with a rotor.

12. A multiple winding machine comprising:

a plurality of winding stations each including a U-shaped winding tool, a wire guide, a switching member, a spring loaded slide mounted in a recess formed by said U-shaped tool, a bore formed in said recess, a positioning catch including a flange connected to said slide and having a guide bolt projecting into said bore, said guide bolt having a helical compression spring connected therewith and extending into said bore, said spring urging said positioning catch and said flange into engagement with a rotor, means for resetting said positioning catch in response to engagement with sliding pieces extending laterally from said slide, said means for resetting urging said slide against force exerted by said helical compression spring, a wire cutting member coupled to said switching member, a pivot arm, first holder means connected to said pivot arm for holding said wire guide and said switching member, second holder means connected to said pivot arm for holding said wire cutting member, pneumatic means for pivoting said pivot arm, a slide means movable in X, Y and Z axes for displacing the wire guide, switching member and the wire cutting member, said wire cutting member being displaceable parallel relative to said wire guide and said switching member, said winding tool having a holding haft positioning surfaces, a counter nut and a spacing top, said tool being rotatable around a winding axis.

13. Apparatus for winding electrical machine rotors comprising:

a U-shaped winding tool for rotating a coil form about a first axis of rotation;

a receiving bore located in said U-shaped winding tool perpendicular to said first axis of rotation for supporting one end of a coil form;

a switching means for rotating the coil form within said receiving bore about a second axis of rotation, a spring biased positioning catch for fixedly positioning a coil winding axis of the coil form about said second axis of rotation, said positioning catch further including means for retaining said coil form within said receiving bore upon rotation of said winding tool about said first axis of rotation.

14. Apparatus of claim 13, wherein said retaining means comprises a flange which abuts against a sheet metal pack of the coil form.

* * * * *